United States Patent [19]

Inoue et al.

[11] Patent Number: 5,246,982
[45] Date of Patent: Sep. 21, 1993

[54] SILICONE RUBBER COMPOSITION

[75] Inventors: Yoshio Inoue; Masachika Yoshino, both of Annaka, Japan

[73] Assignee: Shin-Etsu Chemical Co., Ltd., Tokyo, Japan

[21] Appl. No.: 860,485

[22] Filed: Mar. 30, 1992

[30] Foreign Application Priority Data

Mar. 29, 1991 [JP] Japan ................................. 3-091029

[51] Int. Cl.$^5$ ........................... C08K 9/06; C08K 3/36
[52] U.S. Cl. .................................. 523/212; 524/492; 524/493; 524/847
[58] Field of Search .............. 524/492, 493, 847; 523/212, 213

[56] References Cited

U.S. PATENT DOCUMENTS

| | | | |
|---|---|---|---|
| 2,938,009 | 5/1960 | Lucas | 523/212 |
| 3,004,859 | 10/1961 | Lichtenwalner | 523/212 |
| 3,024,126 | 3/1962 | Brown | 523/212 |
| 3,635,743 | 1/1972 | Smith | 106/490 |
| 4,101,499 | 7/1978 | Herzig | 524/847 |
| 4,360,610 | 11/1982 | Murray et al. | 524/493 |
| 4,701,491 | 10/1987 | Lamont et al. | 524/493 |
| 4,927,587 | 5/1990 | Takahashi et al. | 524/492 |
| 4,985,477 | 1/1991 | Collins et al. | 523/212 |

FOREIGN PATENT DOCUMENTS

| | | | |
|---|---|---|---|
| 0653105 | 11/1962 | Canada | 524/493 |
| 0379340 | 7/1990 | European Pat. Off. | 524/493 |

*Primary Examiner*—Paul R. Michl
*Assistant Examiner*—Peter Szekely
*Attorney, Agent, or Firm*—Millen, White, Zelano & Branigan

[57] ABSTRACT

A silicone rubber composition comprises:

(A) an organopolysiloxane $R_aSiO_{(4-a)/2}$ having an average degree of polymerization of 3000 or greater, wherein R is a substituted or unsubstituted monovalent hydrocarbon group, and 0.0001–0.05 mol % of R is alkenyl; a is 1.95–2.05; and (B) a fine powder of hydrophobic silica, wherein the specific surface area is 50 m$^2$/g or greater, the silica surface includes hydrophobic groups f MesiO$_{3/2}$ and Me$_2$SiO in a weight ratio (MeSiO$_{3/2}$)/(Me$_2$SiO) or 5/95–95/5, and the total carbon content contained in the MeSiO$_{3/2}$ and Me$_2$SiO groups account for 0.5 wt % of greater of the silica. A material obtained by hardening this rubber composition has desirable resistance to steam and LLC.

15 Claims, No Drawings

SILICONE RUBBER COMPOSITION

BACKGROUND OF THE INVENTION

The present invention relates to a silicone rubber composition having a high stability in the presence of steam and/or long-life coolant (LLC), such as anti-freeze solution, which comprises water, polyethylene glycol, and a rust-preventive composition.

Conventionally, in order to produce a silicone rubber composition having excellent physical properties, a mixture consisting of a so-called raw rubber, which comprises a silicone polymer and a silica filler, is used as the base compound. The silica filler may be a hydrophilic fumed silica or a hydrophobic fumed silica. Of these, the hydrophobic fumed silica is capable of mixing well with the raw rubber, and the resulting composition will have little tendency toward crepe hardening and will have excellent strength and transparency. Further, where a hydrophobic fumed silica is used in a process for producing a rubber composition, the temperature and time required to mix the filler with raw rubber are more economical than when other kinds of silica filler are employed. Among such hydrophobic fumed silicas which are in the public domain are ones which have specific surface areas of 50 m$^2$/g or greater and which bear the groups Me$_3$SiO$_{\frac{1}{2}}$ and Me$_2$SiO on their surfaces (Me stands for methyl).

The treatment of the surface of a silica with a silazane compound, such as organocyclosiloxane and hexamethylene disilazane, is known in the art (U.S. Pat. Nos. 2,938,009; 3,004,859; 3,024,126; and 3,635,743). U.S. Pat. No. 4,985,477 teaches treating the surface of a filler with a mixture of MeSiO$_{3/2}$ and Me$_2$SiO. U.S. application Ser. No. 07/467,431 relates to a composition containing a surface-treated filler. The prior art does not teach the use of dimethylchlorosilane as a surface treater to attach the hydrophobic MeSiO$_{3/2}$ and Me$_2$SiO groups to the surface of the silica.

However, the demand for quality silicone rubbers used as industrial materials, such as construction materials and parts of electric and electronic appliances, automobiles, business machines, and household utensils, e.g., food containers, rice boilers, thermo pots, etc., has become so keen that the only silicone rubbers suitable are those that have diverse, as well as excellent, properties, whereby they can perform their functions stably under stricter conditions than were formerly expected. However, conventional silicone rubbers do not have sufficient durability against steam and LLC (e.g., anti-freeze solution) to dependably maintain their functions in their presence.

SUMMARY OF THE INVENTION

Therefore, this invention provides a hardenable silicone rubber composition which will produce a hard material having excellent stability in the presence of steam and LLC in addition to the desirable existing properties inherent in silicone rubbers.

Thus, this invention provides a silicone rubber composition which comprises:

(A) an organopolysiloxane having an average polymerization degree of 3000 or greater and represented by an average compositional Formula (1)

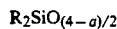

$$R_2SiO_{(4-a)/2} \quad (1)$$

wherein R is a substituted or unsubstituted monovalent hydrocarbon group, wherein 0.0001–0.5 mol % of R is alkenyl, the subscript a is a number 1.95–2.05; and (B) a fine powder of hydrophobic silica having a specific surface area of 50 m$^2$/g or greater, whose silica surface includes hydrophobic groups of the formulae MeSiO$_{3/2}$ and Me$_2$SiO in a weight ratio (MeSiO$_{3/2}$)/(Me$_2$SiO) of 5/95–95/5, and wherein the total carbon content contained in the MeSiO$_{3/2}$ and Me$_2$SiO groups accounts for 0.5 wt % or greater of the total silica weight.

(A) Organopolysiloxane

In Equation (1), R designates a substituted or unsubstituted monovalent hydrocarbon group. The hydrocarbon group may contain preferably 1–8 C atoms, and, of all the R groups, 0.0001–0.5 mol % must be alkenyl. Preferred examples of alkenyl are vinyl and allyl. R groups that are not alkenyl include alkyl, such as methyl, ethyl, propyl, butyl, pentyl, hexyl, octyl, nonyl, decyl, and undecyl; aryl, such as phenyl and tolyl; and aralkyl, such as β-phenylethyl. Substituted hydrocarbon groups include those wherein part or all of the hydrogen atoms attached to carbon atoms are substituted by halogens, such as fluorine or cyano groups, e.g., 3,3,3-trifluoropropyl and cyanoethyl. Most common of the non-alkenyl R groups is methyl. However, if it is intended to impart low temperature resistance, radiation resistance, and transparency to the final material to be obtained as the resulting composition is hardened, 1–30 mol % of the R groups of the organopolysiloxane ought to be phenyl. When it is desired to strengthen oil resistance and gasoline resistance, the organopolysiloxane should be prepared such that 10–50 mol % of its R groups is cyanomethyl and/or 3,3,3-trifluoropropyl.

In Equation (1), the number a is 1.95–2.05; and, in the usual case, it is substantially 2. When a is set to a value of less than 1.95, it becomes difficult to obtain an organopolysiloxane having an average polymerization degree of 3000 or greater; on the other hand, when a is set to a value greater than 2.05, it becomes difficult to reproduce the organopolysiloxane having an average polymerization degree of 3000 or greater with certainty.

Although the organopolysiloxane (A) is substantially constituted by diorganopolysiloxane units, it may contain a modicum of triorganosiloxy units, monoorganosiloxane units, and SiO$_2$ units. Also, the ends of the molecular chains may be terminated by hydroxy and/or triorganosiloxy.

The average degree of polymerization of the organopolysiloxane is the average number of silicon atoms contained in a molecule.

The average degree of polymerization of the organopolysiloxane as ingredient (A) is 3000 or greater and preferably 5000–10,000. If the degree of polymerization is less than 3000, the resulting composition will not produce a material which has sufficient hardness and mechanical strength, such as tensile strength, even if the composition is hardened with the aid of a suitable hardener.

(B) Hydrophobic Silica Fine Powder

The hydrophobic silica fine powder, component (B), is a powder that has a specific surface area of 50 m$^2$/g or greater and preferably 100–400 m$^2$/g. When the specific surface area is less than 50 m$^2$/g, the resulting silicone rubber will not have sufficient hardness and mechanical strength such as tensile strength.

By virtue of the presence of the hydrophobic $MeSiO_{3/2}$ and $Me_2SiO$ groups in the surface of the silica (B), the surface of the silica is rendered hydrophobic.

The silica as the component (B) of the present invention should be prepared in the following manner to impart to the resulting silicone rubber improved mechanical characteristics such as sufficient hardness and tensile strength: A silica whose specific surface area is 50 $m^2/g$ or greater, or preferably from 100–400 $m^2/g$, is treated with dimethyldichlorosilane and/or methyltrichlorosilane; in the case of industrial production, economical dimethyldichlorosilane is highly preferred.

In this treatment, when the temperature is relatively low such as 200°–300° C., the resulting hydrophobic silica will carry only $Me_2SiO$ groups, whereas if the treatment si conducted at a relatively high temperature exceeding 300° C., the resulting hydrophobic silica will carry a large amount of $Me_2SiO$ group and a modicum of $MeSiO_{3/2}$. The surface of the silica used in the present invention carries the $MeSiO_{3/2}$ and $Me_2SiO$ groups in a weight ratio $(MeSiO_{3/2})/(Me_2SiO)$ of 5/95–95/5, and more preferably 20/80–40/60. If the weight ratio is less than 5/95, the resulting composition will fail to produce a material when hardened which has sufficient steam resistance and LLC resistance, whereas if the weight ratio is greater than 95/5, the hydrophobicity of the silica will become too low for the hardened material to have sufficient steam resistance and LLC resistance. The weight ratio of $MeSiO_{3/2}$ to $Me_2SiO$, which is bonded to the silica surface is determined by means of chemical analytical method such as the ethoxysilation method (ref. page 790 of "Silicone Handbook", published in August 1990, by the Nikkan Kogyo Shinbun Ltd.). With this method, it is possible to find out the respective amounts of the $MeSiO_{3/2}$ and $Me_2SiO$ groups contained in the hydrophobic silica used in the composition of the present invention and, hence, the weight ratio between the two groups.

Also, the silica (B) must be constructed such that the carbon content contained in the $MeSiO_{3/2}$ and $Me_2SiO$ groups account for 0.5 wt % or greater of the total silica weight, e.g., up to about 3.0 wt %. If the total amount of carbon exceeds 3.0% per total weight of silica, it will be industrially impractical to attach hydrophobic groups bearing so much carbon. If the total carbons account for less than 0.5% of the silica, the hydrophobicity of the silica will be too low to produce a hardened material that has sufficient steam resistance and LLC resistance. The above-referred ethoxysilation method is effective also to analyze the quantity of the total carbons contained in the $MeSiO_{3/2}$ and $Me_2SiO$ groups.

The dosage of the component (B) is preferably 5–100 weight parts per 100 weight parts of the organopolysiloxane component (A) and more preferably 10–50 weight parts per same. When the dosage of the component (B) is excessive, the resulting composition tends to be too hard to exhibit desirous moldability and, when it is too low, the resulting composition cannot acquire sufficient mechanical strength.

POSSIBLE ADDITIVES

To the rubber composition of the present invention, it is possible to add various additives, as are conventionally added to silicone rubber compositions, without degrading the effects of the invention. Such additives include fillers, such as pulverized silica, diatomaceous earth, iron oxide, zinc oxide, titanium oxide, carbon black, barium oxide, magnesium oxide, cerium oxide, calcium carbonate, zinc carbonate, asbestos, glass wool, pulverized mica, and powder of fused silica; flame retardants, such as antimony oxide and paraffin chlorides; heat conduction improvers, such as boron nitride and aluminum oxide; pigments; dyes, age resisters, anti-oxidants; and antistatic agents.

The dosages and usages of these additives are fully conventional.

MANUFACTURING METHOD

To manufacture the silicone rubber composition of the invention, the components (A) and (B), together with additives, can be charged into a kneading means such as a kneader and the mixture then kneaded at room temperature, and finally subjected to a heat treatment at 100°–200° C. for about 1-5 hours.

HARDENING METHOD

The inventive composition can be hardened by known methods, such as addition reaction promoted by an organo-hydrogenpolysiloxane, as the hardener, in the presence of a platinum-containing catalyst or by employment of an organic peroxide as the hardener.

In the case where the hardenable composition of the present invention is hardened via hydrosilation reaction effected by an organohydrogenpolysiloxane as the hardener, in the presence of a platinum-containing catalyst, the organohydrogenpolysiloxane used is generally one which possesses at least two —SiH groups per molecule; the —SiH groups may be bonded to the molecular chain at its ends or anywhere. The molecular structure of the organo-hydrogenpolysiloxane may be straight-chain, branched, or cyclic. Examples of such organohydrogenpolysiloxanes include ones having the following formulae:

$Me_3Si(OSiMeH)_{38}OSiMe_3$;
$Me_3Si(OSiMe_2)_{27}(OSiMeH)_3OsiMe_3$;
$Me_3Si(OSiMe_2)_{10}(OSiMeH)_5OSiMe_3$;
$Me_3Si(OSiMe_2)_{16}(OSiMeH)_4OSiMe_3$;
$Me_3Si(OSiMe_2)_{50}(OSiMeH)_{10}OSiMe_3$;
$Me_3Si(OSiMe_2)_{70}(OSiMeH)_{20}OSiMe_3$;
$HMe_2Si(OSiMe_2)_{10}(OSiMeH)_2OSiMe_2H$;

$(HMeSiO)_4$

The dosage of the organohydrogenpolysiloxane is preferably such that the —SiH group will exist in an amount of 0.5–10.0 mols for each mole of alkenyl in the organopolysiloxane (A) and more preferably such that the —SiH group will exist in an amount of 1.0–5.0 mols for each mole of alkenyl.

The platinum-containing catalyst used together with the organohydrogenpolysiloxane may be any selected from the known ones generally used in hardening addition reactions. Examples include the fine powder platinum catalyst described in U.S. Pat. No. 2,975,150; the chloroplatinic acid catalyst described in U.S. Pat. No. 2,823,218; a complex compound consisting of platinum and hydrocarbon described in U.S. Pat. Nos. 3,159,601 and 3,159,662; a complex compound consisting of chloroplatinic acid and an olefin described in U.S. Pat. No. 3,516,946; and a complex compound consisting of platinum and a vinylsiloxane described in U.S. Pat. No. 3,814,780.

The dosage of the platinum-containing catalyst may be as small as a catalytically effective amount, and it is preferably 0.1-1000 ppm (when calculated by the net weight of Pt), based on the total weight of the organopolysiloxane (A) and the organohydrogenpolysiloxane, and more preferably, it is 1-100 ppm (same basis).

When hardening the composition of the invention by the addition reaction described above, it is preferable that retarding agents, such as methyvinylcyclotetrasiloxane and acetylene alcohol, are added for the purposes of improving the stability at room temperature and lengthening the pot life and shelf life. Also, when hardening the composition by the addition reaction, it is common that a heat treatment at 60°-200° C. is conducted for about 0.5 to 5 hours.

In the case where an organic peroxide is employed as the hardener, recommended ones include benzoylperoxide bis(2,4-dichlorobenzoyl peroxide; di-tert-butylperoxide; 2,5-dimethyl-di-tert-butylperoxyhexane, tert-butylperbenzoate, benzoate, tert-butylperoxyisopropylcarbonate, and dicumylperoxide. These organic peroxides can be used singly or in combination. The dosage of such organic peroxide(s) is preferably 0.1 to 5 weight parts per 100 weight parts of the organopolysiloxane (A) and more preferably 0.5 to 3 weight parts per same. When hardening the composition by means of such organic peroxide(s), the mixture is commonly heated at a temperature of 100°-300° C. for 5 minutes to 5 hours.

The material obtained after thus hardening the composition of the present invention possesses excellent steam and LLC resistance in addition to high mechanical strength, which are attributes contributed by the hydrophobic silica fine powder contained therein. Thus, the material is useful in making parts of automobiles, fixing rollers of copier machines, parts of electric and electronic appliances, and household utensils, e.g., food containers, rice boilers, and thermo pots. Also, the inventive composition possesses such high Williams plasticity that it makes a good extrusion molding material to produce gaskets for construction use, electrical wire, tubes for medical use, etc. Furthermore, since the inventive composition is highly workable, it provides a good material for producing rubber contacts, rubber nipples for nursing bottles, uniform motion joint boots, plug boots, anode caps, etc.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding Japanese application 3-091029, filed Mar. 29, 1991, are hereby incorporated by reference.

EXAMPLES

Example 1

A mixer is charged with:

100 weight parts of gummy organopolysiloxane consisting of dimethylsiloxy units by 99.825 mol %, methylvinylsiloxy units by 0.15 mol %, and dimethylvinylsiloxy units by 0.025 mol % and having an average degree of polymerization of 8000;

3 weight parts of dimethylpolysiloxane, the ends of which are stopped by silanols and which has an average degree of polymerization of 10; and 40 weight parts of a surface-treated filler having a specific surface area of 130 m$^2$/g and having bonded-to-surface groups MeSiO$_{3/2}$ and Me$_2$SiO by a weight ratio (MeSiO$_{3/2}$)/(Me$_2$SiO) of 25/75 and having bonded-to-surface carbons at a content of 1.2%.

The mixture is kneaded between two rollers and then heat-treated at 150° C. for 4 hours, whereby Base Compound 1 is prepared.

Base Compound 1 is mixed with 0.5 weight parts of cerium oxide and 0.8 weight parts of 2,4-dichlorobenzoyl peroxide (curing agent), and the mixture is kneaded between two rollers, whereby a silicone rubber composition is obtained.

The thus-obtained silicone rubber composition is extruded by a Garbey die based on ASTM 2230, and the extrusion goes smoothly, and the extruded body has no cut line on it. This silicone rubber composition is press-cured at 120° C. for 10 minutes under a pressure of 30 kg/cm$^2$, and a 2 mm thick sheet is formed, which is then post-cured at 200° C. for 4 hours and thereafter measured for the initial physical properties in accordance with JIS K-6301. The result of the inspection is shown in Table 1.

This sheet is left in a fluidized steam at 6.5 kg/cm$^2$ G for 2 weeks, and the physical properties are measured in accordance with JIS K-6301. The result of the measurement is shown in Table 2.

Comparative Example 1

Except that a different surface-treated filler is used, which is one that has a specific surface area of 130 m$^2$/g, has only one kind of bonded-to-surface hydrophobic group, namely, MeSiO$_{3/2}$, and has bonded-to-surface carbons at a content of 0.8%, the same procedure is followed in Example 1; and, as a result, Base Compound 2 is prepared. From Base Compound 2, a silicone rubber composition is obtained by means of the same operation as conducted in Example 1, and the thus-obtained silicone rubber composition is measured as in Example 1, with the result of the initial physical properties shown in Table 1. The composition is then left in a fluidized steam at 6.5 kg/cm$^2$ G for 2 weeks and the physical properties measured the results are shown in Table 2.

TABLE 1

|  | Example 1 | Comparative Example 1 |
|---|---|---|
| Hardness JIS A (degree) | 65 | 64 |
| Tensile Strength (kgf/cm$^2$) | 73 | 75 |
| Extensibility | 280 | 290 |
| Tearing Strength | 8 | 8 |

TABLE 2

|  | Example 1 | Comparative Example 1 |
|---|---|---|
| Hardness JIS A (degree) | 63 | 54 |
| Tensile Strength (kgf/cm$^2$) | 64 | 38 |
| Extensibility | 210 | 100 |
| Weight Loss (%) | −0.8 | −2.8 |

EXAMPLES 2-4

In Examples 2-4, the same procedure as in Example 1 is followed, except that the surface-treated fillers used are as specified in Table 3 and the dosage of the dimethylpolysiloxane is 5 weight parts instead of 3 weight parts, whereupon a base compound is formulated. To this compound is added 1.0 weight part of iron oxide (Fe$_2$O$_3$) and 0.5 weight part of 2,5-bis(tert-butylperoxy)-2,5-dimethylhexane. The mixture is then kneaded between two rollers and press-cured under 30 kg/cm$^2$ at 170° C. for 10 minutes. From this, a 2 mm thick sheet and a 12.65 mm thick test piece are formed, the latter for testing the compression set. The sheet is post-cured similar to Example 1, and the physical properties of the sheet are measured. The test piece is compressed by 25% and kept in a 50% long-life coolant (LLC/H$_2$O=50/50) at 175° C. for 72 hours, and the compression set is thereby measured. The results of the measurement is shown in Table 3.

Comparative Example 2

The same procedure as in Example 1 is followed, except that the surface-treated filler used is as specified in Table 3, and the dosage of the dimethylpolysiloxane is 5 weight parts instead of 3 weight parts, whereupon a base compound is formulated. From this base compound, a silicone rubber composition is obtained in the same manner as in Examples 2-4. Also, similar to Examples 2-4, the sheet properties and compression set of the silicone rubber composition is analyzed. The results of the measurement is shown in Table 3.

As can be seen, the compositions of the present invention, when hardened, make a hard material with excellent steam resistance and LLC resistance in addition to the good properties possessed by conventional silicone rubber.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

TABLE 3

| | Ex. 2 | Ex. 3 | Ex. 4 | Comp. Ex. 2 |
|---|---|---|---|---|
| Starting Silica Specific Surface Area (m$^2$/g) | 130 | 130 | 200 | 130 |
| MeSiO$_{3/2}$/Me$_2$SiO (weight ratio) | 20/80 | 60/40 | 25/75 | 0/100 |
| bonded-to-surface carbon (%) | 1.3 | 1.0 | 1.8 | 1.5 |
| hardness JIS A (degree) | 64 | 65 | 72 | 64 |
| tensile strength (kgf/cm$^2$) | 69 | 72 | 85 | 70 |
| extensibility (%) | 280 | 270 | 180 | 280 |
| tearing strength JIS B (kgf/cm) | 14 | 12 | 18 | 14 |

TABLE 3-continued

| | Ex. 2 | Ex. 3 | Ex. 4 | Comp. Ex. 2 |
|---|---|---|---|---|
| compression set (%) | 60 | 62 | 68 | 78 |

What is claimed is:

1. A silicone rubber composition comprising:
   (A) an organopolysiloxane having an average degree of polymerization of 3000 or greater and represented by $$R_aSiO_{(4-a)/2}$$

wherein
   R is a substituted or unsubstituted monovalent hydrocarbon group, of which 0.0001-0.5 mol % is alkenyl;
   a is 1.95-2.05; and
   (B) a fine powder of hydrophobic silica having a specific surface area 50 m$^2$/g or greater, whose surface includes hydrophobic groups MeSiO$_{3/2}$ and Me$_2$SiO in a weight ration (MeSiO$_{3/2}$)/(Me$_2$SiO) of 5/95-95/5, and wherein the total carbon content contained in the MeSiO$_{3/2}$ and Me$_2$SiO groups account for 0.5 wt % or greater of the total silica weight.

2. A composition of claim 1, wherein alkenyl is vinyl or allyl.

3. A composition of claim 2, wherein R is methyl, phenyl, cyanoethyl, and/or 3,3,3-trifluoropropyl.

4. A composition of claim 1, wherein n is 5000-10,000.

5. A composition of claim 1, wherein the specific surface area of the hydrophobic silica is 100-400 m$^2$/g.

6. A composition of claim 1, wherein the (MeSiO$_{3/2}$)/(Me$_2$SiO) ratio if 20/80-40/60.

7. A composition of claim 1, wherein the total carbon content of the MeSiC$_{3/2}$ and Me$_2$SiO groups is about 0.5% to about 3.0 wt % of the total silica weight.

8. A composition of claim 1, wherein the amount of (B) is effective to impart steam and LLC resistance to said composition.

9. A composition of claim 1, wherein the amount of (B) is 5-100 weight parts per 100 weight parts of (A).

10. A hardened composition obtainable by hardening the rubber composition of claim 1.

11. A hardened composition comprising the reaction product of a silicone rubber composition of claim 1 and an organohydrogenpolysiloxane.

12. A hardened composition of claim 10, wherein hardening is effected by reaction with an organohydrogenpolysiloxane and a platinum catalyst.

13. A hardened composition of claim 10, wherein hardening is effected by reaction with an organohydrogenpolysiloxane and an organic peroxide hardener.

14. A method for hardening a silicone rubber composition of claim 1, comprising reacting the latter With an organohydrogenpolysiloxane and a platinum catalyst or an organic peroxide hardener.

15. A composition of claim 1, wherein the fine powder of hydrophobic silica is prepared by treating a silica powder having a specific surface area of 50 m$^2$/g or greater with dimethyldichlorosilane or methyltrichlorosilane or a mixture thereof.

* * * * *